United States Patent [19]

Barnard

[11] Patent Number: 5,027,413
[45] Date of Patent: Jun. 25, 1991

[54] TARGET DETECTION SYSTEMS

[75] Inventor: Michael E. Barnard, Reigate, England

[73] Assignee: U.S. Philips Corp., New York, N.Y.

[21] Appl. No.: 366,102

[22] Filed: Jun. 13, 1989

[30] Foreign Application Priority Data

Jun. 17, 1988 [GB] United Kingdom ............... 8814411

[51] Int. Cl.$^5$ .............................................. G06K 9/00
[52] U.S. Cl. .......................................... 382/1; 382/39; 358/125; 358/126; 250/332
[58] Field of Search ...................... 382/1, 39; 358/125, 358/126; 342/192; 250/332

[56] References Cited

U.S. PATENT DOCUMENTS

| | | | |
|---|---|---|---|
| 3,947,833 | 3/1976 | Eckstein, Jr. | 382/39 |
| 4,497,065 | 1/1985 | Tisdale et al. | 382/1 |
| 4,550,435 | 10/1985 | Hayman | 358/126 |
| 4,739,401 | 3/1988 | Sacks et al. | 382/1 |

FOREIGN PATENT DOCUMENTS 1304833 1/1973 United Kingdom .
2032725 5/1980 United Kingdom .

OTHER PUBLICATIONS

Proceedings of EUSIPCO-86 Sep. 1986, Signal Processing III: Theories and Applications, pp. 657 to 660.

Primary Examiner—Leo H. Boudreau
Assistant Examiner—Rohini Khanna
Attorney, Agent, or Firm—William L. Botjer

[57] ABSTRACT

A target detection system is provided for examining picture signals of a scene which may contain a target signal (15,16) to be detected against background signals (17,18). The image is divided into sub-images and sub-stores are provided one each for the sub-images (19). The values of a set of features, such as brightness, volume or quietness, of the background and target picture signals associated with each sub-image in the respective sub-store are calculated and stored. The statistical distributions of the background and target features in each sub-store to set a target decision threshold, in feature terms, for each sub-image are calculated. The feature values of an incoming picture signal in a sub-image are compared with the decision threshold in the associated sub-store to provide a target detection signal. Each sub-image threshold relates to the image status in that particular sub-image. A lower false alarm rate with a higher detection probability is provided.

4 Claims, 2 Drawing Sheets

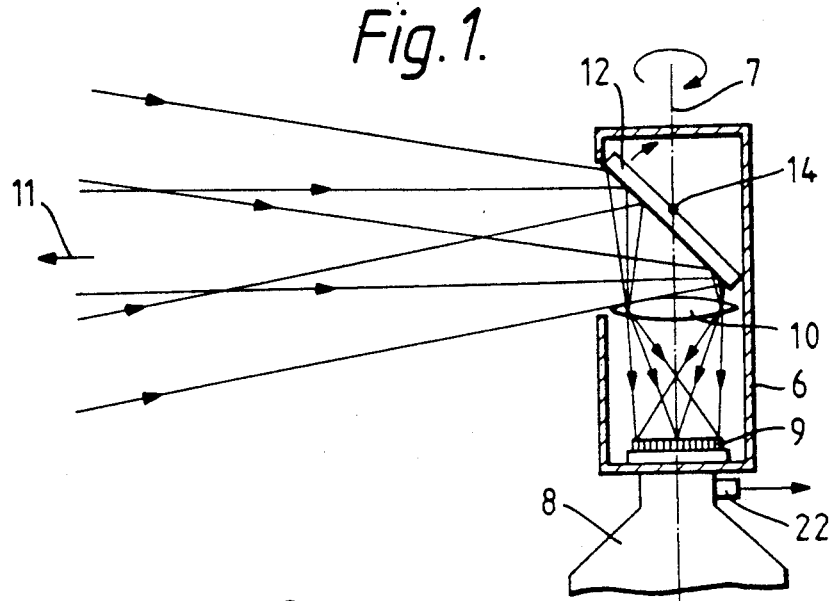
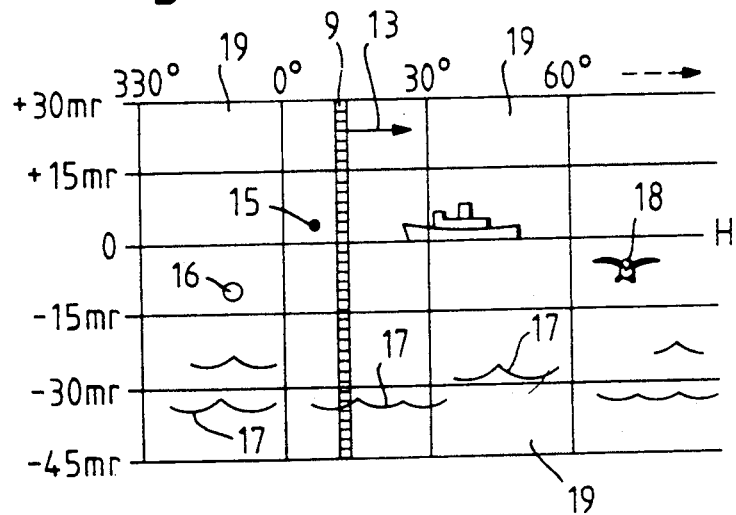
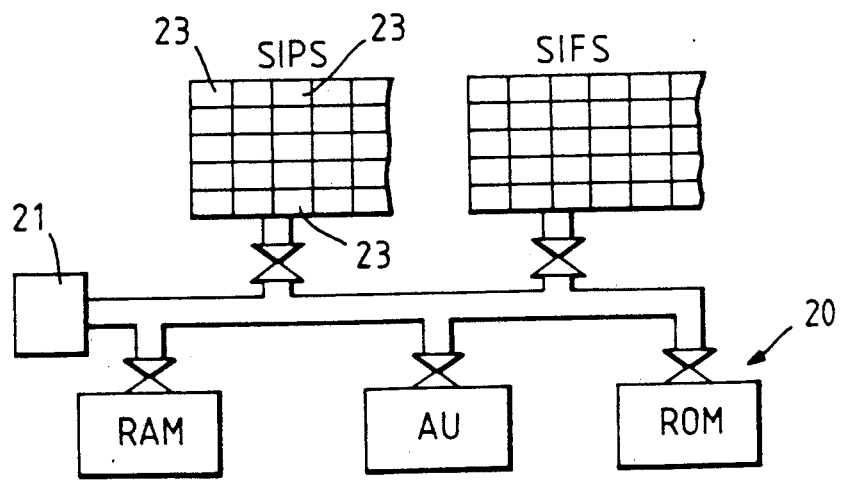

5,027,413

TARGET DETECTION SYSTEMS

BACKGROUND OF THE INVENTION

This invention relates to target detection systems. More particularly it relates to a target detection system comprising means for repetitively deriving picture signals representing an image of a scene, which picture signals may contain a target signal to be detected against background signals, means for calculating and storing the values of a set of features of an accumulated set of background picture signals and for calculating and storing the statistical distribution of each feature from the accumulated set, means for storing predetermined values of the same set of features of a second set of picture signals due to known targets and for calculating and storing the statistical distribution of each feature from the second set, means for comparing the statistical distribution of the background features with that of the target features to set a target decision threshold as a function of feature values, and means for comparing the feature values of an incoming picture signal with the threshold to detect a target.

Such target detection systems are used in imaging infrared target detection systems where the expected target is of limited spatial extent, typically only a few picture elements (pixels) in width and height. A typical target might be an approaching sea-skimmming missile, infrared radiation being generated by the propulsion motor of the missile or by the heated nose cone of the missile in the case of a supersonic missile.

Such target detection systems assume that the image is homogeneous, whereas in fact most images contain several distinct regions. For example a seascape image will contain an area of sky, several distinct areas in the sea as well as a horizon area. Additionally there is a variation in background conditions as a function of azimuth due to solar radiation and to cloudscapes. Thus the set of background picture signals and the features derived from them may have so large a distribution that the setting of a single threshold may lead to targets being overlooked at some elevations or azimuths, or to an excessive false alarm rate at others.

SUMMARY OF THE INVENTION

It is an object of the present invention to provide improved reliability of target detection and to reduce the false alarm rate in spite of the abovementioned variation in background signals. The invention provides a target detection system as set out in the opening paragraph characterised in that the image is divided into a plurality of sub-images, in that a plurality of sub-stores are provided, one each for the sub-images, in that means are provided for storing the calculated values of the set of features of the background and target picture signals associated with each sub-image in the respective sub-store, in that means are provided for calculating the statistical distributions of the background and target features in each sub-store to set a target decision threshold for each sub-image, and in that means are provided for comparing the feature values of an incoming picture signal in a sub-image with the decision threshold in the associated sub-store. Thus the accumulated set of background picture signals and the calculated features thereof of each sub-image take into account the history of the local conditions of the sub-image. As new picture signals arise in the sub-image, the oldest stored picture signals are discarded in favour of the new and the statistical distributions of the features recalculated and the threshold reset. Thus the threshold adapts slowly to changes in the local conditions in the sub-image.

In radar systems it is known to store the mean return value in each of a number of contiguous range/azimuth cells which together cover the area of surveillance of the radar. Such a store of values is known as a clutter map.

The features that are calculated are those of a cluster of contiguous picture elements which are each of more than a threshold level of brightness. The features that may be calculated include the brightness of the brightest pixel of the cluster, the sum of the brightnesses of the pixels immediately surrounding the brightest pixel which gives an indication of cluster size, or the sum of the brightnesses of the next outlying ring of pixels which should be quiet, or of low value, indicating that the cluster is not larger than an expected size. Other features may be functions of the distribution of pixel brightnesses indicating symmetry, width or height of the cluster. Each feature is expressed as a numerical quantity having a range of values. For some features a low value may be desirable, for others a high value. As the number of detected pixel clusters in a sub-image grows, the statistical distribution of values of each feature becomes evident.

A target detection system in accordance with the invention may be characterised in that means are provided to calculate the width of the statistical distributions of the background and target features and to discard a feature as a threshold parameter if the width of the statistical distribution of that feature exceeds a predetermined amount, or if the feature mean varies by more than a preset amount over a succession of scene images. Thus a particular cluster feature may prove to have two wide a spread and therefore may be unreliable as a guide to discriminating between background and target features.

The target detection system may be further characterised in that means are provided for applying a filter to the picture signals before the features are calculated, the filter being chosen to attenuate those signal frequencies characteristic of background signals. The filter may be matched to the expected target signal. Such a matched filter is described by L. G. Bohmer in the Proceedings of EUSIPCO-86 Sept. 1986, Signal Processing III : Theories and Applications, pages 657 to 660.

BRIEF DESCRIPTION OF THE DRAWINGS

An embodiment of the invention will now be described, by way of example, with reference to the accompanying drawings in which, FIG. 1 shows a scanning thermal imaging apparatus which can provide a thermal image of the horizon scene all around an observation point, FIG. 2 shows a typical horizon scene scanned by the apparatus of Figure, the scene being divided into sub-images, FIG. 3 shows a digital computer with picture element and feature spaces stores for carrying target detection signal processing.

DETAILED DESCRIPTION OF THE PREFERRED EMBODIMENTS

Figure 4:
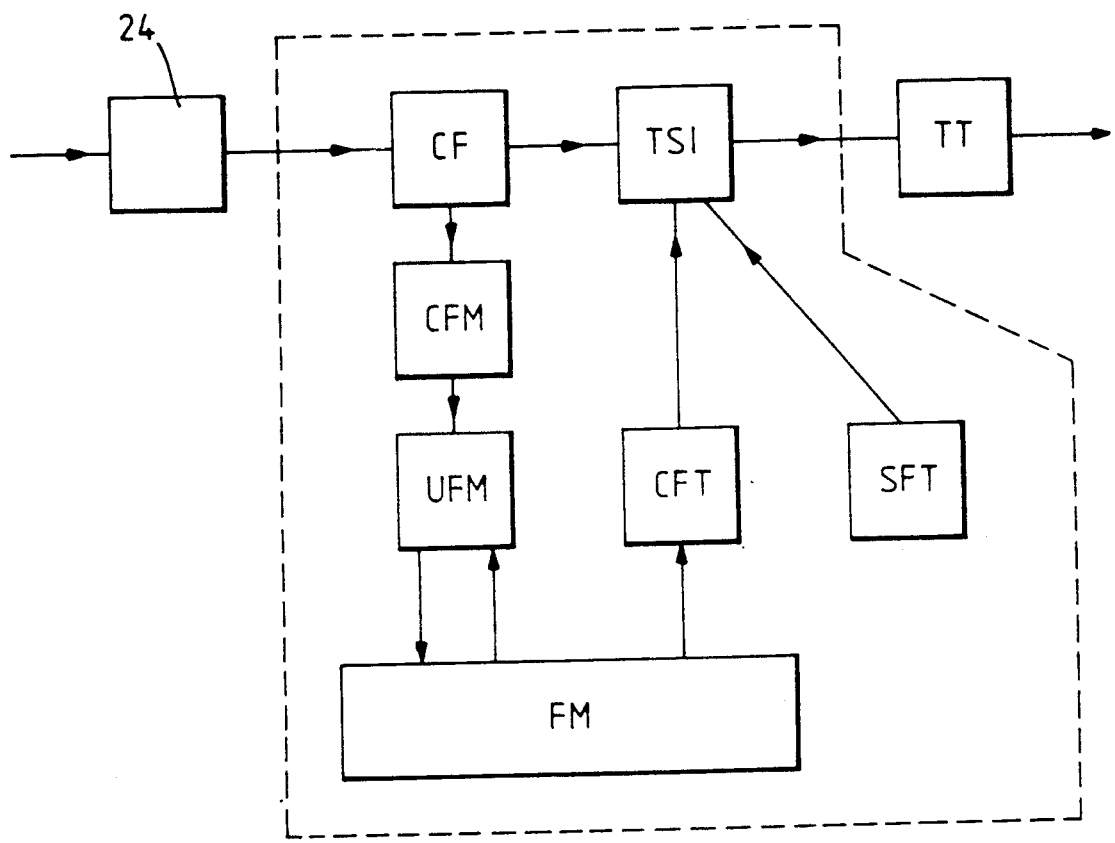
FIG. 4 shows a block diagram of the signal processing steps employed.

Referring to FIG. 1, there is shown the optical and mechanical components, in schematic form, of a thermal imaging apparatus which is provided as a means of observation, typically set high in the superstructure of a ship, to watch for hostile incoming missiles, aircraft, etc. The apparatus, contained within a casing 6, is rotated continuously about an axis 7 with respect to a base 8 which is gyro-stabilised, by means not shown, to maintain the axis 7 vertical, i.e. so that the scan direction is parallel to the horizon H shown in FIG. 2. Within the casing, a horizontal linear array 9 of infra-red detectors is provided, the length of the array lying in the plane of the drawing. An IR objective lens 10, having its optical axis coaxial with axis 7, focuses an image of a distant horizon scene 11, via 45 degree mirror 12, onto the horizontal plane containing the detector array. The detector array, lens and mirror 12 rotate as one with the casing, the projected image of the array remaining vertical at the horizon throughout the 360 degree rotation. FIG. 2 shows a typical horizon scene with the projected image of the detector array 9 shown vertical and scanning horizontally 13. In a typical apparatus 120 detectors would be provided in the array and the focal length of the lens 10 chosen so that the projected length of the array covers a vertical angle of 75 milliradians (mr). The mirror 12, nominally set at 45 degrees to axis 7, is arranged to be pivotable about a horizontal axis 14 normal to the plane of the drawing to be set to cover a desired vertical field of view. As shown in FIG. 2, 30 mr above the horizon and 45 mr below the horizon are covered. Thus a point source 15 some 5 mr above the horizon is seen against a sky background and a closer sea-skimming source 16 some 10 mr below the horizon is seen against a sea background. Wave crests 17 closer to the apparatus can also constitute point sources of radiation, as can a seagull 18.

Thus, each detector in the linear array traces out a horizontal path in the scene at a constant angular elevation or depression and provides an analogue signal proportional to the infrared radiance of the scene details it encounters. Such line scanning thermal imaging apparatus is well known in the art of thermal target detection. Also well known is the processing of the output of each detector in the array to remove detector artefacts and the majority of the background clutter signals using a prewhitening filter such as a bandpass filter. Each detector output is then sampled to provide picture element (pixel) values, digitised, and a matched filter applied tailored to the expected target signal profile. A d.c. threshold is then usually applied to the matched filter output and the surviving pixel values retained in a store preserving their relative positions. These processes will not be described further since they are not relevant to the present invention and are well known in the art. The target detection system in accordance with the invention is applied to the results of this prior processing, these results being contained in a store having a store location for each pixel in the whole horizon image. Each store location will contain the value of that pixel for a complete scan of the horizon. Thus the present situation of each pixel and its neighbours are available to be subjected to the target detection processes to be described.

FIG. 2 shows the whole image divided into a plurality of sub-images 19, in this example rectangular sub-images each 30 degrees wide by 15 milliradians high. The pixel store is divided into a corresponding array of sub-stores, one for each sub-image as will be described in more detail later. It should be noted that, in general, a sub-image is a selection of pixels from the image forming a contiguous group of pixels. The geometry of the sub-images can be chosen to suit expected areas of consistent background and target behaviour in particular scenes. Sub-images which are circular, square, rectangular, linear or patterns of linear segments may be appropriate for certain areas of cloudscape or for stationary geographical features such as hills, or for horizon lines. Certain areas may not be foreseen as having particular background characteristics and the boundaries of such areas may be positioned automatically with the detection system in operation.

FIG. 3 shows a digital computer 20 arranged and programmed to receive the stream of digitised pixel values from a signal pre-processing unit 21 and to store them in the sub-image pixel stores SIPS. The location addresses for each pixel are taken from the position values of the associated detectors in the array 9 and from a scan azimuth angle signal generator 22 in FIG. 1. The computer 20 comprises a read only memory ROM containing the detailed programming to be described, an arithmetic unit AU for carrying out the programme steps, and a random access memory RAM for storing intermediate results obtained during the programme calculations. The sub-image pixel stores 23 correspond one each to the sub-images 19. A sub-image feature store SIFS is provided to store information about features of detected objects as will be described later.

Any non-zero pixel or cluster of contiguous non-zero pixels in a sub-image store constitutes an object of interest. The object may be a target or a background item to commence the process of determining which the object comprises, certain features of the object are first calculated. FIG. 4 shows all the steps of target detection according to the invention set out as a schematic flow chart from which the detailed programming of the computer 20 of FIG. 3 is derived. The prior processed store of pixel values is indicated schematically at 24, and the calculation of feature follows at CF.

Figure 5:
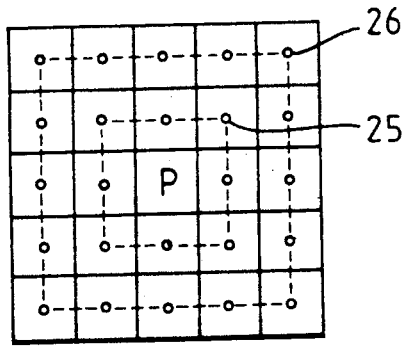
FIG. 5 shows the array of pixel around a given pixel which are used to calculate object features.
Figure 6:
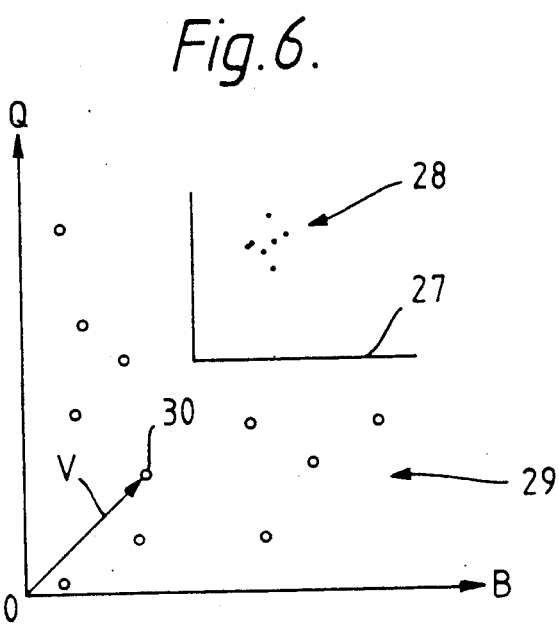
FIG. 6 shows a schematic plot of object feature space and the target detection threshold.

FIG. 5 shows the square array of 24 pixels surrounding each pixel P in each of the sub-image pixel stores SIPS, each square indicating a storage location holding a pixel value. Assuming P to be a non-zero value, P will usually be surrounded by other none-zero pixels. The first feature of P is the value of P itself, termed the brightness feature B. The next feature is the sum of the pixel values of the eight pixels 25 immediately adjacent to P, this sum being termed the size feature S since by its magnitude it gives an indication of the object size regardless of its shape. It should be noted in this connection that a distant target, such as a head-on approaching missile, will be below the resolving power of the optical system of the IR scanner. The pixel spacing is chosen to be smaller than the resolving power so that even a distant point target will generate signals in a number of contiguous pixels. A third feature may be the sum of the sixteen pixels 26 next surrounding the pixels 25. This feature may be termed the quietness feature Q since the lower its value is, the less extraneous picture elements surround the object. Other features may be used which are functions of the values of a selection of all twenty five picture element values. These features may indicate shape, width, height, symmetry or lack of symmetry. Thus several features can be calculated and each will have a numerical value in a range of values. For some features a high value may be more indicative of a target, whereas for other features a low value may indicate a target. For any one feature, the feature values of predetermined targets may lie in the range of values found for background objects and hence that feature alone is not sufficient to discriminate the target from the background. It is known to resolve this problem by taking the numerical values of a number of selected features for objects found in the image and plotting them in a multi-dimensional feature hyperspace. A selection of features can usually be found in which it is possible to place a threshold hypersurface in the feature space which effectively separates target objects from background objects. FIG. 6 illustrates this known approach using only two features B and Q, but only for clarity of drawing. It will be seen that a threshold line 27 can be drawn which separates the cluster 28 of target objects from the cluster 29 of background objects. The values of B and Q taken alone would not separate them, the B values of the targets lying within the range of background B values and likewise for the Q values of targets and background. Each plotted set of features for an object, 30 for example, can be regarded as a vector V plotted in the hyperspace, target and background vectors being separated by the threshold hypersurface 27.

At each scan of the whole scene by the thermal imaging apparatus objects may be detected in the sub-images. The features of any objects found in a sub-image in a scan are calculated immediately by the computer of FIG. 3 and feature values stored in the associated sub-image feature store SIFS. On succeeding scans the number of objects detected in a sub-image grows and the FIG. 4 diagram shows the step of calculating the progressive means of each feature CFM and its variance. At each new sample of a feature the feature map FM of FIG. 4 is updated by UFM to contain the latest mean and variance of that feature. SIFS, therefore, contains FM.

The sub-image locations of SIFS also contain a predetermined mean and variance of target features as expected in each sub-image. This predetermined information may have been derived from previously observed targets in earlier scans.

Thus each sub-image store contains, in general, a different set of feature means and variances for both background and target objects. The target detection threshold for each sub-image, line 27 in FIG. 6 being an example, is set by first assuming that the set of values of a feature in the associated SIFS store have a Gaussian distribution having the calculated mean and variance. The Gaussian distributions of all the background object features of a sub-image are then combined into a first multidimensional probability surface. In the same way a second multidimensional probability surface is formed for the predetermined target object features of that sub-image. The location of the target detection threshold is calculated at the intersection of the two probability surfaces, i.e. where the probabilities of an object being a target or a background point are equal, that is, in accordance with Baye's criterion. Since this threshold calculation from the statistical information is a well known mathematical technique it will not be described further and is indicated as CFT in FIG. 4.

The sub-image feature space thresholds are established as the result of several complete scans of the scene. Each object detected in a sub-image has its features calculated, CF, which are then applied to the threshold of that sub-image, TSI, any resulting signal indicating a target being passed to the target tracking processor TT for further tests on action. A set of stored fixed thresholds, one for each sub-image, are provided at SFT to provide back-up for the calculated thresholds which slowly adapt to changes in each sub-image as the record of old object features is up-dated in favour of more recent object features.

The set of features used in one sub-image may differ from those in other sub-images. A feature in a sub-image may be rejected if its variance is too large or if its mean varies too greatly with succeeding scans, i.e. it may be found to be unreliable.

From reading the present disclosure, other modifications will be apparent to persons skilled in the art. Such modifications may involve other features which are already known in the design, manufacture and use of target detection systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A target detection system comprising: means for repetitively deriving picture signals representing an image of a scene, which picture signals may contain a target signal to be detected against background signals, in that the image is divided into a plurality of sub-images; a plurality of sub-stores, one for each of the sub-images; means for calculating and storing values of a set of features of background picture signals associated with each sub-image in the respective sub-store; means for calculating and storing a statistical distribution of the background features; means for calculating and storing values of a set of features of target signals associated with each sub-image in the respective sub-store; means for calculating and storing a statistical distribution of the target feature; means for comparing the statistical distribution of the background features with that of the target features to set a target decision threshold as a function of feature values for each sub-image; and means for comparing feature values of an incoming picture signal in a sub-image with the target decision threshold in the associated sub-store to detect a target.

2. A target detection system as claimed in claim 1 characterised in that means are provided to calculate the width of the statistical distributions of the background and target features and to discard a feature as a threshold parameter if the width of the statistical distribution of that feature exceeds a predetermined amount, or if any of the feature statistics varies by more than a preset amount over a succession of scene images.

3. A target detection system as claimed in claim 1 characterised in that means are provided for applying a filter to the picture signals before the features are calculated, the filter being chosen to attenuate those signal frequencies characteristic of background signals.

4. A target detection system as claimed in claim 3 characterised in that the filter is matched to an expected target signal.

* * * * *